3,275,518
TABLET COATING

Clarence J. Endicott, Winthrop Harbor, and William T. Martin, Waukegan, Ill., assignors to Abbott Laboratories, North Chicago, Ill., a corporation of Illinois
No Drawing. Filed Apr. 18, 1963, Ser. No. 273,817
4 Claims. (Cl. 167—82)

This application is a continuation-in-part of our application U.S. Serial No. 146,021, filed June 7, 1961, now abandoned.

This invention relates to tablets suitable for oral administration characterized by a thin film coating of a water-permeable, plastic or resin composition and to the method of making such coated tablets.

In recent years, various plastics have found their way into the tablet coating art but up to the present time only a limited number of them have been found useful for coating medicinal tablets. Due to the fact that only a few plastics or resins are water-permeable, the selection of synthetic plastics and resins for tablet coating has been extremely limited. The plastics or resins heretofore proposed as useful, however, are deficient in various respects in that some of these earlier proposed plastics and resins are quite reactive and cannot be used universally for any active drug due to reactivity of the resin with the active drug or core of the tablet. For instance, if the core is alkaline, adherence of the previously proposed cellulose acetate phthalate to the tablet leaves much to be desired, and, if the core is acidic, the cellulose acetate phthalate becomes less soluble in water and the digestive fluids. This stems from the fact that cellulose acetate phthalate has a significant percentage of free carboxy groups which also have certain other undesirable properties.

It is therefore an object of the present invention to provide a tablet suitable for oral administration which is coated with a thin plastic or resinous film which is substantially water-permeable. It is another object of the invention to provide a tablet coated with a synthetic, water-permeable plastic or resin which is chemically inert but readily disintegrates in the simulated gastric and intestinal fluids described in U.S.P. (16th edition). It is a further object of the present invention to provide a tablet suitable for oral use having a coating which permits rapid release of the active ingredient from the tablet core as evidenced by the Tablet Disintegration Test likewise described in U.S.P. (16th edition).

These and other objects are accomplished, according to the present invention, by providing a tablet coating composition which is comprised of a portion of a hard, water-soluble or water-dispersible, waxlike substance and a portion of a film-forming resin or plastic selected from the group consisting of poly(methylstyrene), methylstyrene/acrylonitrile copolymers, poly(vinyl chloride), vinyl butyral, pentaerythritol or alkyd esters of rosin or modified rosin, and terpene derived alkyd resins. Several other ingredients may be added to the previously named essential components in order to enhance the properties of the coating obtained from the composition. Among the more important of these additional materials are dyes, pigments, water-insoluble waxes, plasticizing agents, wetting agents, drying agents and flavoring agents.

One of the hard, water-soluble or water-dispersible waxlike substances to which the invention pertains is a poly-(ethylene glycol) having a melting point of at least 45° C. However, it is to be understood that similar physiologically acceptable materials of this class can be substituted therefor. Among the water-dispersible waxes which may be used are glyceryl monostearate and diglycol stearate.

Among the coloring agents which may be used in the practice of this invention are any of the non-toxic dyes, lakes, and pigments which have been certified for use in the food, drug and cosmetics industries. Among the water-insoluble waxes which are suitable as additives are beeswax, lanolin, stearic acid, Onesta wax, cocoa butter and cetyl alcohol. As plasticizing agents, castor oil, mineral oil, corn oil, sesame oil or propylene glycol may be used. If desired, a drying oil such as soy bean oil or a surface active agent such as the polyoxyethylene sorbitan derivatives or the sulfated fatty alcohols may be added. In the case of dyes, it may be necessary to deposit the dye on a pharmaceutically acceptable carrier such as aluminum hydroxide.

When the foregoing composition is applied to tablets in the manner hereinafter described, it is possible to provide a suitable coating for a tablet or the like with the use of relatively few coats or applications of the coating material, producing a thin, flawless coat over the tablet core. Another highly important advantage of this invention is that the coating composition described above can be applied from an organic solvent boiling below 85° C., reducing the drying period between coats substantially. Hence, it is possible to completely coat a tablet in a matter of minutes where prior practices have required four to six days to obtain a suitable coating. Another advantage of the present invention is the fact that the synthetic resins which form a substantial part of the present coating composition are chemically inert to simulated gastric and intestinal fluids as well as the reactive entities in the tablet core so that no interaction between these resins and the drug occurs. This lessens the probability of chemical incompatibilities being encountered, and decreases the problems encountered in the actual physical application of the coating to the core.

When the coating composition described herein is applied without coloring agent, a pleasing white tablet is obtained. The transparent coating may be rendered opaque by the addition of a quantity of an opaqueing agent or a white pigment such as titanium dioxide, if desired. The invention is also most highly suited to the application of colored film coatings of the type described in which a small quantity of a suitable coloring agent such as dyes, lakes, or pigments is incorporated into the coating solution prior to application on the tablets. In this manner, a highly pleasing colored appearance is given to the tablets and the tablets are regarded as elegant in the terms of the trade. A tablet coated according to the practice of this invention is considerably smaller in size than one coated by the heretofore conventional sugar coating procedure, and the small tablet is more acceptable because it can be swallowed more easily.

It is preferred to use between about 14% and 20% w./v. of the hard, water-soluble or water-dispersible, waxlike substance in making up the fluid coating composition for application to tablets. Likewise, about 4% to 7% w./v. of the film-forming resin is desirable. The water insoluble waxy adjuvant is not used in a concentration greater than 5% w./v. and a plasticizing agent is used in concentrations of from 1% to 5% w./v. In this manner, the finished tablet coating contains between about 66% and about 84% by weight of the hard, waxy, water-soluble or water-dispersible substance, and between about 16% and about 34% by weight of the film-forming resinous substance. The percent by weight of additives such as colorants, plasticizers, and waxy adjuvants in the new coating composition is quite small and usually does not exceed 10% by weight of the total amount of the coating composition.

The following examples are presented in order to describe the invention more fully, but it should be understood that the invention is not intended to be limited by these examples. In the examples, reference is made to a film-forming resin solution which is made up as follows:

10 g. of the resin named
3 ml. of propylene glycol
1 ml. of sorbitan monooleate
40 ml. of alcohol
Acetone q.s. to 100 ml.

The amount of the resin in such a solution is 10% w./v. and in the examples when it is stated that, for instance, 300 ml. of resin solution is used, it is to be understood that there will be 30 g. of the resin in the solution, or 10% w./v. The tablets referred to in the examples are convex shaped milk-sugar tablets made on a 5/16 inch punch. The coating liquid in all examples is used in an amount of approximately 100 ml. of coating fluid per pound of tablets.

*Example 1*

A tablet coating solution is made up according to the following formula:

Poly(ethylene glycol) 6000 _____g__ 70
Poly(methylstyrene), 10% w./v. solution ____ml__ 300
Acetone, q.s. to 500 ml.

The poly(ethylene glycol) is dissolved in a portion of warm acetone and is then added to the poly(methylstyrene) solution. The remainder of the acetone is added and the mixture is thoroughly stirred. The solution is applied to a rotating bed of tablets by pouring small portions onto the tablets. As the tablets rotate, the material distributes evenly over the surface thereof and within a few minutes the solvents evaporate, leaving a dry, hard film. Thereafter, a second portion of the above solution is applied in the same manner and subsequent coats are applied until a film of the desired thickness is obtained. Tablets coated in this manner are pleasing in appearance and disintegrate within the time limits specified in U.S.P. (16th edition).

*Example 2*

A solution suitable for coating tablets is prepared according to the following formula:

Poly(ethylene glycol) 4000 _____g__ 70.0
Methylstyrene/acrylonitrile copolymers 10% w.v.
  solution _____ml__ 300
Yellow dye D & C #11 _____ml__ 300
Acetone, q.s. to 500 ml.

The formula is made up in the manner described in Example I except that the yellow dye is added to a portion of the acetone prior to thoroughly mixing the solutions. Tablets coated with 10–20 coats of this solution give a very pleasing yellow appearance, and are much smaller than identical tablets which have undergone subcoating and sugar coating of the standard tableting procedure.

*Example 3*

A solution suitable for use in coating tablets is prepared according to the following formula:

Poly(ethylene glycol) 20,000 _____g__ 70.0
Poly(vinyl chloride), 10% w./v. solution ____ml__ 300
Castor oil _____g__ 1.25
Acetone, q.s. to 500 ml.

This solution is made up and applied to tablets in the same way as described in Example 1. The film applies to the tablets very evenly with suitable distribution on the sides, edges and faces of the tablets. A few coats of the foregoing solution give a film of approximately 60 microns in thickness and provides a suitable, tasteless and pleasing film about the tablet core.

*Example 4*

A solution for use in coating tablets is prepared as follows:

Poly(ethylene glycol) 4000 _____g__ 70.0
Vinyl butyral resin, 10% w./v. solution _____ml__ 300
Beeswax _____g__ 5.0
Acetone, q.s. to 500 ml.

This solution is prepared similarly to the preceding solutions except that the beeswax is dissolved in acetone by heating the acetone to about 50° C. When the acetone cools, the beeswax may come out in a very fine suspension which, however, does not alter the characteristics of the film. The film obtained on tablets in the manner described in the above example is smooth and even and deposits uniformly on the sides, edges and faces of the tablet.

*Example 5*

The following solution for coating tablets is prepared as described below:

Poly(ethylene glycol) 6000 _____g__ 70.0
Rosin-based semialkyd (acid No. 78, softening point
  118° C.), 10% w./v. solution _____ml__ 300
Yellow dye D & C #11 _____g__ 300
Castor oil _____g__ 1.25
Stearic acid _____g__ 5.0
Acetone, q.s. to 500 ml.

The poly(ethylene glycol) and the stearic acid are added to warm acetone and when the acetone has cooled, the yellow dye and castor oil are added thereto. The entire solution is mixed with the resin solution and thereafter applied to tumbling tablets in the customary coating pan. A portion of about 10 ml. of the solution is applied to about 2000 tablets and after about five minutes of tumbling time, the film formed is evenly distributed on all of the tablets and is substantially dry. Thereafter, another 10 ml. portion is applied and the same procedure is repeated until a coating of suitable thickness has been formed on the tablets.

*Example 6*

The following solution is made up according to Example 5:

Poly(ethylene glycol) 6000 _____g__ 100.0
Terpene-based alkyd resin (softening point
  100–110° C., specific gravity 1.24), 10% w./v.
  solution _____ml__ 350
D & C Red Dye #35 _____mg__ 100
Corn oil _____g__ 1.25
Cocoa butter _____g__ 5.0
Acetone, q.s. to 500 ml.

This solution is applied to tumbling tablets in the manner described in Example 5. In this example, 20% w./v. of waxlike substance and 7% w./v. of resin is contained in the coating fluid.

*Example 7*

A solution suitable for application to tablets and the like to form a thin film thereon, is made up according to the following formula:

Poly(ethylene glycol) 4000 _____g__ 100.0
Methylstyrene/acrylonitrile copolymer, 10% w./v.
  solution _____ml__ 200
Green Dye D & C #1 _____g__ 4.0
Mineral oil _____g__ 1.25
Lanolin _____g__ 5.0
Acetone, q.s. to 500 ml.

This solution is prepared in the same manner as set forth in the preceding examples and differs therefrom in containing 20% w./v. of the water-soluble, waxlike material and 4% w./v. of the acrylonitrile/methylstyrene copolymer in solution.

Example 8

A solution suitable for tablet coating is made up from the following ingredients:

| | |
|---|---|
| Poly(ethylene glycol) 6000 _____ g__ | 70.0 |
| Poly(methylstyrene), 10% w./v. solution __ml__ | 200 |
| Orange Dye D & C #4 _____ mg__ | 250 |
| Orange Lake D & C #17 _____ g__ | 4.0 |
| Sesame oil _____ g__ | 1.25 |
| Cetyl alcohol _____ g__ | 5.0 |
| Acetone, q.s. to 500 ml. | |

The solution is made up in the manner set forth in the previous examples, differing in containing 14% w./v. of poly(ethylene glycol) 6000 and 4% w./v. of poly(methylstyrene) in the solution. The like portion in the above color additives provides greater depth of color and superior covering power for the colorant in the solution than using a dye only.

Example 9

A tablet coating solution is made up as in previous examples with the following components:

| | |
|---|---|
| Poly(ethylene glycol) 6000 _____ g__ | 70.0 |
| Vinyl butyral resin, 10% w./v. solution _____ml__ | 300 |
| Red Lake D & C #3 _____ g__ | 6.0 |
| Castor oil _____ g__ | 1.25 |
| Beeswax _____ g__ | 5.0 |
| Acetone, q.s. to 500 ml. | |

When applied to tablets, this solution provides a pleasing, glossy red color with strong covering power.

In a modification of this example, the Red Lake D & C #3 is substituted with 3 g. of red iron oxide pigment. Tablets coated with such a modified composition show a dull red color, also with very good covering power.

Example 10

A solution for coating tablets is prepared according to the following formula:

| | |
|---|---|
| Poly(ethylene glycol) 4000 _____ g__ | 100.0 |
| Rosin-based semialkyd with an acid No. of 135–145 and a softening point of 128°–138° C., 10% w./v. solution _____ ml__ | 350.0 |
| Vinyl stearate _____ g__ | 5.0 |
| Acetone, q.s. to 500 ml. | |

In this solution the vinyl stearate is employed as an anti-sticking agent. The film obtained on tablets according to the method in the foregoing examples is smooth and even and deposits uniformly on the sides, edges and faces of the tablets.

All of the coated tablets described in the foregoing examples readily disintegrate within the time limits specified in the tablet disintegration test described in U.S.P. (16th edition).

Others may practice the invention in any of the numerous ways which will be suggested to one skilled in the art by the present disclosure. All such practice of the invention is considered to be a part hereof provided it falls within the scope of the appended claims.

We claim:
1. A method of coating tablets suitable for oral administration which comprises applying to a tablet a therapeutically acceptable coating composition which readily disintegrates in simulated gastric and intestinal fluids consisting essentially of
   (a) a film-forming material selected from the group consisting of poly(methylstyrene), methylstyrene-acrylonitrile copolymers, vinyl butyral, poly(vinylchloride), pentaerythritol and alkyd esters of rosin, pentaerythritol esters of modified rosins and terpene-based alkyd resins, and
   (b) a compound selected from the group consisting of glyceryl monostearate, diglycol stearate and a poly(ethylene glycol) having a melting point of at least 45° C.
2. A method as claimed in claim 1 in which the poly(ethylene glycol) employed has a molecular weight of 6000.
3. A method as claimed in claim 1 in which the coating is applied from an organic solvent with a boiling point of less than 85° C.
4. A method as claimed in claim 1 in which the finished tablet coating contains from 16% to 34% by weight of the film-forming material and from 66% to 84% by weight of a poly(ethylene glycol) having a melting point of at least 45° C.

References Cited by the Examiner

UNITED STATES PATENTS

| | | | |
|---|---|---|---|
| 2,085,490 | 6/1937 | Blaikie _____ | 99—135 |
| 2,353,927 | 7/1944 | Pickett _____ | 99—135 |
| 2,385,920 | 10/1945 | Jenkins _____ | 167—82 |
| 2,444,871 | 7/1948 | Cohoe _____ | 99—135 |
| 2,468,393 | 4/1949 | Corkery et al. _____ | 99—135 |
| 2,519,775 | 8/1950 | Lougovoy _____ | 99—135 |
| 2,702,264 | 2/1955 | Klaui _____ | 167—82 |
| 2,881,085 | 4/1959 | Endicott et al. _____ | 167—82 |
| 3,070,509 | 12/1962 | Volker et al. _____ | 167—82 |

FOREIGN PATENTS

| | | |
|---|---|---|
| 762,229 | 11/1956 | Great Britain. |
| 764,342 | 12/1956 | Great Britain. |

JULIAN S. LEVITT, *Primary Examiner.*

FRANK CACCIAPAGLIA, JR., *Examiner.*

G. A. MENTIS, *Assistant Examiner.*